United States Patent [19]

Tsubouchi et al.

[11] Patent Number: 4,583,366
[45] Date of Patent: Apr. 22, 1986

[54] VACUUM BRAKE BOOSTER

[75] Inventors: Kaoru Tsubouchi, Toyota; Michiharu Nishii, Chiryu, both of Japan

[73] Assignee: Aisin Seiki Kabushiki Kaisha, Kariya, Japan

[21] Appl. No.: 428,411

[22] Filed: Sep. 29, 1982

[30] Foreign Application Priority Data

Oct. 9, 1981 [JP] Japan .......................... 56-149516[U]

[51] Int. Cl.[4] ............................................. B60T 13/00
[52] U.S. Cl. ..................................... 60/547.1; 92/169; 92/98 D
[58] Field of Search ......................... 92/169, 98 D, 94; 60/547.1

[56] References Cited

U.S. PATENT DOCUMENTS

| | | | |
|---|---|---|---|
| 3,120,296 | 2/1964 | Randol | 220/18 |
| 3,137,361 | 6/1964 | Randol | 92/169 |
| 3,628,422 | 12/1971 | Acre | 91/369 B |
| 4,007,664 | 2/1977 | Popp | 91/49 |
| 4,330,996 | 5/1982 | Becht | 60/581 |
| 4,353,291 | 10/1982 | Hauduc | 92/169.2 |
| 4,433,614 | 2/1984 | Takeuchi | 91/376 R |
| 4,445,331 | 5/1984 | Weiler | 92/169 |

FOREIGN PATENT DOCUMENTS

| | | | |
|---|---|---|---|
| 0004477 | 10/1979 | European Pat. Off. | 92/169 |
| 0120444 | 9/1981 | Japan | 92/169.2 |
| 2070171 | 9/1981 | United Kingdom | 92/169 |

*Primary Examiner*—Abraham Hershkovitz
*Attorney, Agent, or Firm*—Oblon, Fisher, Spivak, McClelland & Maier

[57] ABSTRACT

A vacuum booster having a master cylinder and which includes a body having a bent portion, a reinforcing member connected to the body and having a flange member extending therefrom and a mechanism for installing the master cylinder onto the body as reinforced by the reinforcing member wherein a bending center of the bent portion of the body is located further inside the body than the location of the bending center of such flange of the reinforcing member.

4 Claims, 4 Drawing Figures

VACUUM BRAKE BOOSTER

BACKGROUND OF THE INVENTION

1. Field of the Invention

This invention relates to brake boosters for vehicles and more particularly to vacuum brake boosters having a master cylinder mounted thereon.

2. Discussion of the Background

A conventional vacuum brake booster has a power piston which is actuated by vacuum pressure which is, in turn, controlled in response to depression force on a brake pedal, and a master cylinder having a primary piston which is actuated in association with movement of the power piston. Since the primary piston of the master cylinder is associated with power piston of the booster, it has been proposed that the master cylinder be directly secured to the body of the brake booster. The thickness of the body may be preferably minimized for the purpose of lightening the weight of the vehicle and, therefore, a reinforcing member 12 may be provided at an inner side portion of the body of the booster in order to increase the strength thereof as shown in FIG. 3. In FIG. 3, reinforcing member 12 is made of metal and is of a doughnut configuration having inner and outer circumference flanges 15, only one of such flanges 15 being shown in FIG. 3. The reinforcing member 12 is arranged between a body 2 of the brake booster and a bolt 13 to install the master cylinder on the body 2 of the brake booster, and a projection 18 of the head of bolt 13 is then welded to the reinforcing member 12 and a projection 20 of the body 2 is welded to the reinforcing member 12. Thus, bolt 13 and reinforcing member 12 are secured to the body 2. However, $r_2$ is located further outside than the location of $R_1$ where $r_2$ is the center of radius $R_2$ of a bent portion 17 of the body 2 and $r_1$ is a center of bending radius $R_1$ of flange 15. Therefore, bent portion 17 of body 2 is spaced from the reinforcing member 12 and thus, only the weld projection 20 of the body 2 is subjected to stress generated about bolt 13 upon operation of the brake and the durability of the body is correspondingly reduced.

SUMMARY OF THE INVENTION

Therefore, it is an object of the present invention to provide a new and improved vacuum brake booster which obviates the above-mentioned prior art drawback.

It is another object of the present invention to provide a new and improved vacuum brake booster which is high in durability and is simple in construction.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein.

DETAILED DESCRIPTION OF THE PREFERRED EMBODIMENTS

Figure 1:
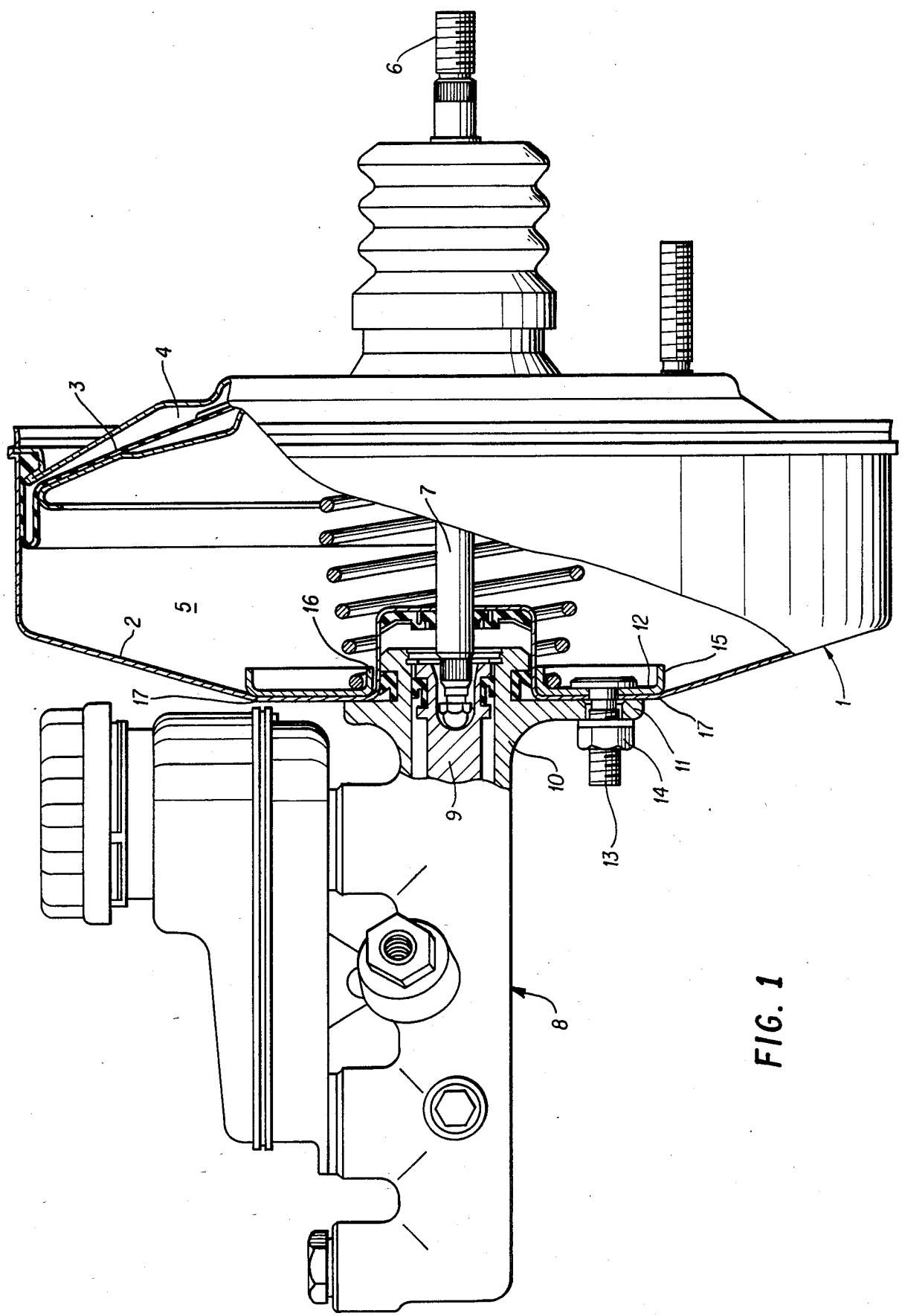
FIG. 1 is a partial cross-sectional view of a vacuum brake booster according to the present invention.

As shown in FIG. 1, a vacuum brake booster 1 includes a body 2 and a diaphragm 3 secured to the body 2 so as to thereby define two chambers 4 and 5, chamber 5 selectively receiving a vacuum from an engine intake manifold. When the brake pedal is depressed, a rod 6 is moved to the left so as to operate a valve means (not shown) to thereby introduce vacuum into chamber 5. Thus, a power piston 7 which is in association with diaphragm 3 is boosted so as to be moved to the left by vacuum pressure.

A left end portion of power piston 7 is operatively connected to a primary piston 9 of a master cylinder 8 which is provided on the body 2 of brake booster and then primary piston 9 is moved to supply braking fluid under pressure into associated wheel cylinders (not shown). The master cylinder 8 comprises a cylinder body 10 having a flange 11 which is installed on the outer side of body 2 by means of a bolt 13 and a nut 14. A reinforcing member 12 is positioned on the inner side of body 2 by the above-noted bolt 13 and nut 14.

The reinforcing member 12 may be a metal plate of doughnut configuration and has outer and inner flanges 15, 16 which extend to the right, respectively. The body 2 of booster 1 is drawn at a bent portion 17 thereof which is near the flange 15 and then is formed into a dish shape.

Figure 2:
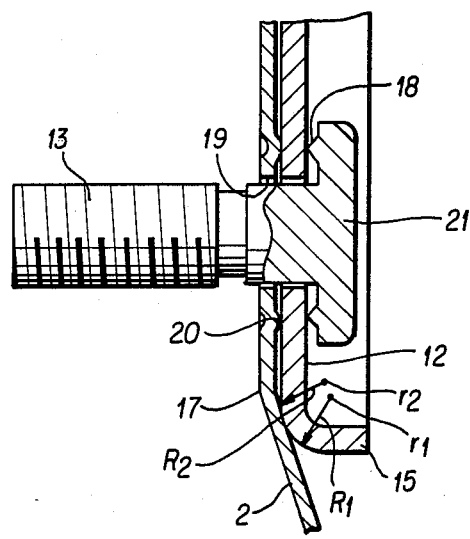
FIG. 2 is an enlarged cross-sectional view of a part of FIG. 1.
Figure 3:
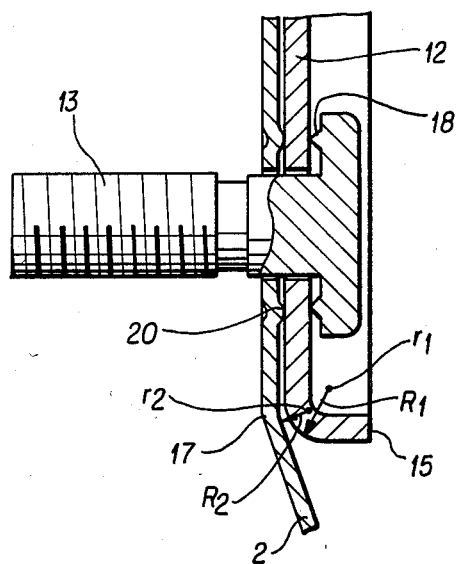
FIG. 3 is a view similar to FIG. 2, but showing a conventional part.

As shown in FIG. 2, a head 21 of bolt 13 has an annular projection 18 which faces the reinforcing member 12 and is formed when bolt 13 is forged. The body 2 has a hole 19 for allowing the passage of bolt 13 and an annular projection 20 which faces the reinforcing member 12 and is positioned around the hole 19. The projection 20 is formed when the body 2 is press-formed or when the hole 19 is made. After bolt 13, reinforcing member 12 and body 2 are positioned as shown in FIG. 2, a pair of electrodes of a projection welder are brought into contact with a portion of head 21 of bolt 13 and the outside surface of body 2 which corresponds to the head portion, respectively, so that reinforcing member 12 and body 2 are pressurized and electric current flows between both electrodes. Thus, projection 18, a portion of reinforcing member 12 which is in contact with projection 18, projection 20 and a portion of reinforcing member 12 which is in contact with projection 20 are partially melted and are deposited or welded together so as to form a unitary member. Therefore, reinforcing member 12 and bolt 13 are secured to the interior of body 2. The above deposition between body 2, reinforcing member 12 and bolt 13 is completed around hole 19 so as to thereby complete a sealing function.

Figure 4:
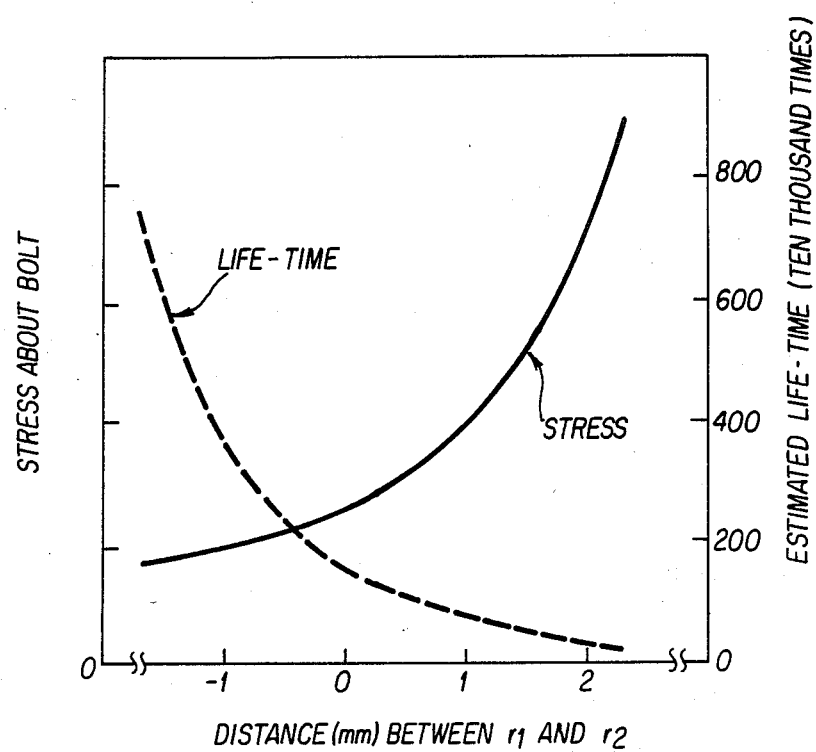
FIG. 4 is a graph showing the relation between stress generated about a bolt to install a master cylinder on a body of brake booster and the life-time of booster body.

In the above construction, $r_2$ is arranged so as to be located further inside of body 2 than the location of $r_1$ where $r_2$ represents the center of radius $R_2$ of bent portion 17 of body 2 which is drawn toward the outer periphery thereof and $r_1$ is the center of bending radius $R_1$ of flange 15. Namely the bent portion of flange 15 will be positioned further outside than the bent portion 17 of body 2. In other words, bent portion 17 is formed so as to face and contact a portion of the flat surface of reinforcing member 12. Thus, the bent portion 17 will be in contact with the bent portion of flange 15. Accordingly, stress generated about bolt 13 upon operation of the brake will be dispersed at two portions of body 2, namely deposited portion of projection 20 and bent portion 17, whereby the stress applied to body 2 will be reduced. FIG. 4 illustrates the stress about bolt 13 which body 2 receives, and the life-time of a body wherein the distance between $r_1$ and $r_2$ is shown by a negative value in the situation where $r_2$ is arranged so as to be located further inside of body 2 than the location of $r_1$ as in the present invention and the distance between $r_1$ and $r_2$ is shown by a positive value in the situation where $r_2$ is arranged to be located further outside than the location of $r_1$ as in the case of the prior art. The term life-time means the durability of body 2 around bolt 13 when a load of 300 Kg is repeatedly applied to a brake booster of 9 inch size. As will be clearly understood from FIG. 4, stress about bolt 13 applied to body 2 will be reduced in the present invention.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A vacuum booster for a vehicle having a master cylinder, comprising
    a body having a bent portion;
    a reinforcing member spaced from and welded to said body and including a bent flange member extending therefrom and a connection portion interconnecting said reinforcing member and said bent flange member; and
    means for installing said master cylinder onto said body as reinforced by said reinforcing member such that a load transmitted from said master cylinder is in turn transmitted to a body of said vehicle via said reinforcing member wherein;
    said bent portion is located at an axial end wall of said body and is in engagement with said master cylinder and which further comprises a circular flat surface portion located at an inner radial portion thereof and a substantially conically shaped portion located at an outer radial portion thereof;
    said master cylinder is fixed to an exterior portion of said circular flat surface portion by said means for installing said master cylinder onto said body;
    said connecting portion contacts said conically shaped portion of said bent portion;
    said reinforcing member is engaged with an interior portion of said circular flat surface portion;
    said bent flange member is formed on an outer peripheral portion of said reinforcing member and extends in an axial direction from said reinforcing member away from said end wall of said body; and
    a center of radius of said bent portion is located radially within a center of bending radius of said flange member and an outer diameter of said reinforcing member is greater than that of said bent portion.

2. A vacuum booster as set forth in claim 1, wherein said means for installing said master cylinder onto said body further comprises a bolt having a head portion with an annular projection and wherein said annular projection engages said reinforcing member.

3. A vacuum booster as set forth in claim 1 or 2, wherein said body further comprises a projection extending therefrom for engaging said reinforcing member.

4. A vacuum booster as set forth in claim 1, wherein said means for installing said master cylinder onto said body further comprises a bolt having a head portion with an annular projection, wherein said annular projection engages said reinforcing member, said body further comprises a projection extending therefrom for engaging said reinforcing member and wherein said means for installing said master cylinder onto said body further comprises means for unitarily connecting said annular projection of said head portion of said bolt, said reinforcing member and said projection of said body.

* * * * *